United States Patent Office 2,928,885
Patented Mar. 15, 1960

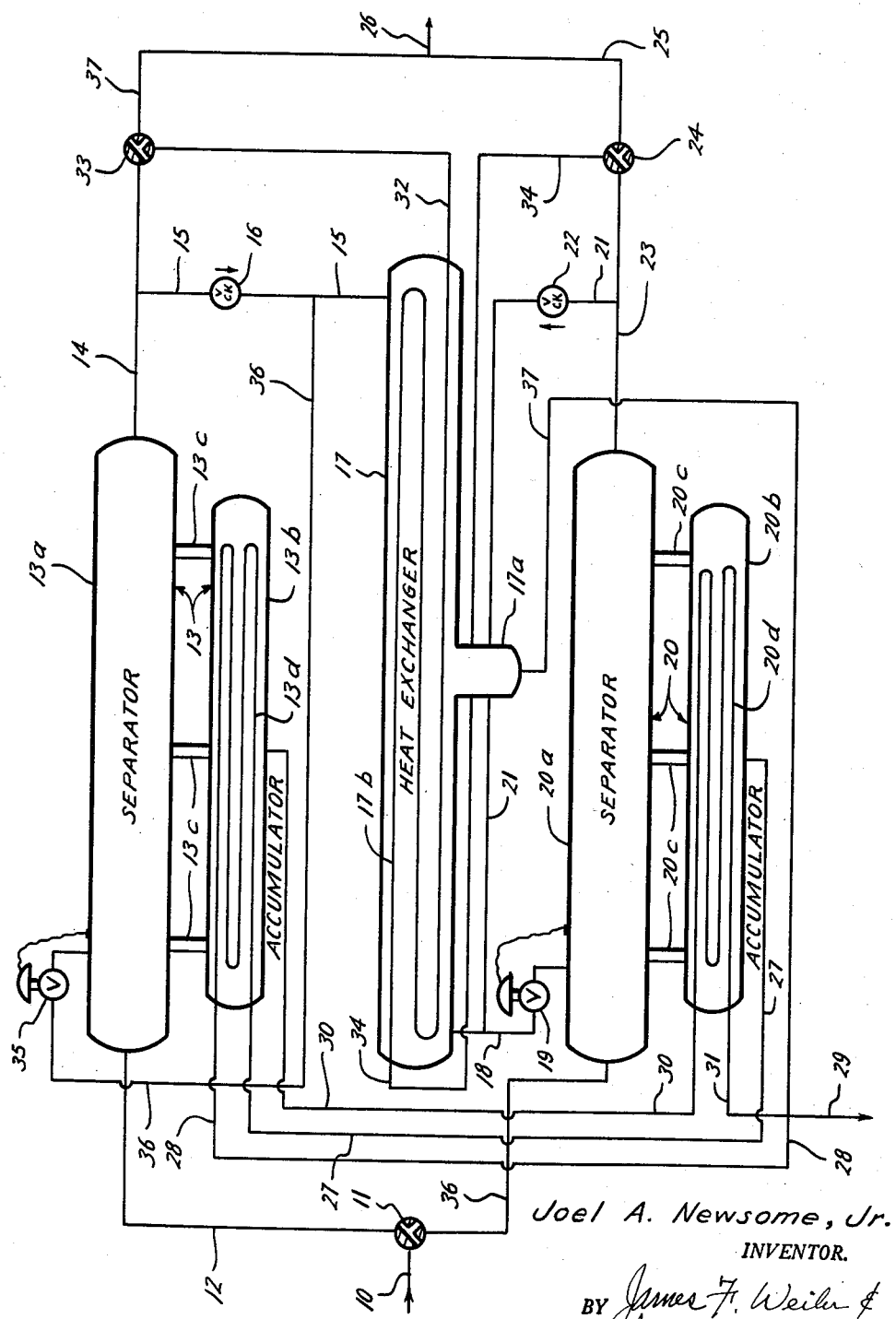

2,928,885

METHOD AND MEANS FOR RECOVERING CONDENSABLE VAPORS CONTAINED IN HYDRATE-FORMING MIXTURES

Joel A. Newsome, Jr., Houston, Tex., assignor to Chillgas Corporation, Houston, Tex., a corporation of Texas Application July 25, 1956, Serial No. 600,059

9 Claims. (Cl. 260—676)

The present invention relates to methods of and means for removing and recovering condensable vapors contained in mixtures and more particularly relates to the recovery of condensable hydrocarbon vapors and removal of water vapors and impurities from hydrocarbon vapors in high pressure systems such as those produced as natural gas from well bores.

The present invention is particularly suited for the recovery of condensable vapors under relatively high pressure from natural occurring deposits and, for the purpose of disclosure, an example of the invention is described in this connection. It will be understood, of course, that the invention may be adapted to other uses which will readily be apparent to those skilled in the art.

In the production of liquid fuels from natural occurring deposits, such as oil, gas and like wells, a large amount of vapors are produced as a part of the total fluid. In my copending application, Serial No. 502,995, filed April 21, 1955, now abandoned, a method of and means for removing these vapors is described and claimed. In my copending application, Serial No. 600,077, filed July 25, 1956, now abandoned, such a continuous method and means are described and claimed which is particularly suited to low pressure systems. The present invention is directed to a continuous method and means similar to the last-mentioned application, but is particularly suited for high pressure systems.

The present invention takes advantage of the cooling effect produced by expansion of gas without the application of external refrigeration, although this may be provided if so desired. The present invention and method constitute improved ones in that highly advantageous and satisfactory results have been obtained by the deliberate formation of ice or gas hydrates in portions of the system and by alternately recycling so that ice or gas hydrates are formed in other portions of the system and the previously formed ice and gas hydrates are melted.

In previous high pressure systems it has been the practice to prevent the formation of hydrates in reducing the temperature of the system for the recovery and removal of these vapors. To this end, chemical inhibitors have been injected into the feed gas. While these inhibitors tend to prevent the formation of gas hydrates, this is not entirely satisfactory due to the fact that the inhibitors are either completely lost or if an attempt is made to recapture the inhibitor, only a portion is recaptured at great expense. For example, in using alcohol as an inhibitor, the inhibitor is lost completely which adds considerably to the expense of the recovery system. If a very expensive chemical inhibitor is used, for example, ethylene glycol, a large portion is recaptured, but it must be purified with field equipment before it can be reused. The addition of a chemical inhibitor and either losing or recapturing and purifying a portion of the inhibitor is a substantial and major expense of the entire recovery system.

It is therefore a general object of the present invention to provide an improved method of and means for liquefaction of condensable vapors contained in mixtures in high pressure systems so that the liquefied vapors may be separated and removed from the system.

It is a further object of the present invention to provide an improved method of and means for liquefaction of hydrocarbon vapors from mixtures of hydrocarbon vapors contained in high pressure systems so that the liquefied hydrocarbon vapors may be separated and recovered from the system.

It is yet a further object of the present invention to provide such a method of and means for liquefaction of vapors contained in mixtures in high pressure systems in which it is unnecessary to add any chemical inhibitor to the vapors thereby avoiding the expense of adding the same.

It is yet a further object of the present invention to provide a method of and means for the liquefaction of hydrocarbon vapors from mixtures of such vapors in high pressure systems in which the temperature of the systems is lowered by a pressure drop and which utilizes the noncondensable vapors and condensable vapors in the operation thereof.

Yet a still further object of the present invention is the provision of such an improved method and system in which condensable hydrocarbon vapors are liquefied and removed and which includes the removal of condensable impurities from the vapor mixture.

A still further object of the present invention is the provision of a continuous method of and means for the liquefaction of vapors contained in mixtures in high pressure systems which is reversible in operation so that cycling may take place to provide a predetermined formation of hydrates or solids in a portion of the system during which time formed hydrates are melted in another portion of the system.

Yet a further object of the present invention is the provision of apparatus including a pair of separators joined to each other by flow lines to a common heat exchanger and which includes pressure drop controls arranged with each separator so that the pressure of the vapor stream flowing to the separator from the heat exchanger is decreased whereby a first condensation is provided at the temperature and pressure of the incoming stream, a cooling and further condensation is provided by the heat exchanger, and a pressure drop and further cooling and condensation is provided by the tail separator.

Still a further object of the present invention is the provision of the apparatus mentioned before including means for flowing the uncondensed vapors from the tail separator through the heat exchanger for cooling the vapors from the first separator before discharging the uncondensed vapors from the system.

A still further object of the present invention is the provision of such an apparatus in which the heat exchanger is of elongate construction and the vapors from the separators enter opposite ends thereof so that solids are deliberately formed at one end while formed solids are melted at the other end.

A still further object of the present invention is the provision of such an apparatus which includes means for reversing the flow through the system so that solids formed in one part are periodically melted while solids are being formed in another portion of the system thus making the system a continuous one.

Other and further objects, features and advantages will readily be apparent as a description of a presently preferred example of the invention, given for the purpose of disclosure, proceeds.

While the invention may be applied to other systems and other uses, as previously mentioned, for the purpose of disclosure, the invention is described as it may be applied to flow lines or pipes through which hydrocarbon vapors pass from their source to a distribution system. As mentioned before, however, the invention may be used with any suitable system and in many places in the system, but is particularly directed to continuous systems under relatively high pressures.

The present invention utilizes a reduction of pressure of the hydrocarbon vapors as a step or a portion of the means of reducing the temperature of the system, but differs from previous systems in that gas hydrates or solid particles are deliberately formed and periodically liquefied so that they may be removed from the system without interrupting the flow of vapors through the system. Chemical additives are unnecessary to the system; however, if desired, chemical additives may be added to increase the effectiveness of the present invention although highly satisfactory results have been obtained without using this expedient.

In the production of hydrocarbons from natural formations, such as oil and gas wells, it is common practice to flow the produced fluids through a conductor pipe set in the earth to surface equipment for the removal of fractions and/or the removal of impurities, such as water, and then through pipes to a distribution system. Unless a method of and means for the removal of water vapor and/or impurities are provided, the hydrocarbon vapor system will be saturated with water vapor and/or include impurities at the temperature and under the pressure conditions of the distribution system. In common practice these systems are maintained at the temperature of the surrounding atmosphere and/or the media through which they pass or, under certain conditions, at a temperature in excess of the surrounding media in order to prevent the formation of solid particles, such as gas hydrates or ice in the system. As mentioned previously, however, the advantages, objects and ends of the present invention are achieved by the deliberate formation and subsequent liquefaction of gas hydrates or ice in portions of the system and by reversing the system so that formed gas hydrates or ice are melted and are formed in other corresponding portions of the system.

For simplicity in disclosure in describing an apparatus according to the invention, and the method involved in using this particular apparatus, the reversing or cycling of the system and apparatus is described as manual. It will be understood, however, that this reversing or cycling can be done automatically, such as by suitable pressure differential controls, temperature controls, time controls and the like if desired. The apparatus of the invention will best be understood by reference to the accompanying drawing where The figure is a flow diagram illustrating apparatus constructed according to the invention.

Before referring to the drawings, the apparatus of the invention comprises generally a pair of separators interconnected by flow lines through a central heat exchanger, pressure control means being provided so that condensation and separation take place in the first separator at a relatively high pressure and above hydrate forming temperature, condensation and separation takes place in the heat exchanger below hydrate forming temperature at substantially the same pressure as the incoming feed, and a pressure drop is provided so that condensation and separation take place in the tail separator at reduced pressure and at a temperature well below hydrate forming temperature. Means are provided so that the cooled uncondensed vapor from the tail separator is used to provide the refrigeration for the heat exchanger and reversible controls are provided so that flow through the system may be reversed.

Referring now to the drawing, the reference numeral 10 designates a flow line or a gathering pipe which conducts a gas stream, such as well effluent, including a mixture of vapors from its source to a distribution system, not shown. The source may be the well proper or separation equipment to separate liquids from gas or from any other source. In the case of oil and gas wells, the flow stream in the pipe or flow line 10 usually consist of gaseous and liquid hydrocarbon components and water in vapor phase, as well as impurities in vapor phase, such as carbon dioxide, and the like. The mixture of vapors in the flow line or gathering pipe 10 ordinarily is at an elevated pressure, for example 1500 p.s.i.g. and ordinarily is at an elevated temperature, say 100° F., although it may be at different pressures and temperatures.

The well effluent entering the system through the gathering pipe 10 first passes through the three-way valve 11 into the pipe 12 and enters the separator or separation vessel 13 which is composed of two generally parallel, elongate, cylindrical vessels, an upper separation vessel 13a and a lower accumulator vessel 13b interconnected by the downwardly-extending pipes 13c disposed at spaced intervals and joining the upper separation vessel 13a and the lower accumulator vessel 13b. Thus, well effluent entering the separation vessel 13 enters the upper separation vessel 13a where the liquid phase and vapor phase are separated, the liquid phase collecting in the bottom section 13b and the vapor phase being discharged through the pipe 14 connected at one end to the separation vessel 13a. The means for removal of the liquid phase from the accumulator vessel 13b is described later.

Following the flow of vapors through the system, a flow line or pipe 15 is connected to the pipe 14 and includes the check valve 16, the pipe 15 being connected to one end of the heat exchanger 17 for introducing the vapors into the shell side thereof. The heat exchanger preferably is a generally elongate cylindrical vessel which has the downwardly extending generally cylindrical vessel 17a at its lower central portion which serves as an accumulator for the heat exchanger 17. It is noted that there is no pressure drop provided between the separator 13 and the heat exchanger 17 and the vapors enter the heat exchanger 17 adjacent one end at substantially the same temperature and pressure as they enter the system. Thus, under the condition assumed for the purpose of disclosure, the vapors enter the heat exchanger at 1500 p.s.i.g. and at 100° F.

The other elements of the heat exchanger 17 and the removal of condensed liquids from the accumulator 17a will presently be described. It should be noted, however, that heat is removed from the vapors as they pass through the heat exchanger shell 17 causing condensation of liquids, both hydrocarbons and water which are collected in the accumulator 17a at the bottom of the shell. The mixtures are reduced below the hydrate stability condition of temperature and pressure, approximately 50°–60° F. at 1500 p.s.i.g., for the deliberate formation of solid hydrates in the cold end of the exchanger which are deposited on the external walls of the tubes 17b disposed in the heat exchange 17.

Following the flow of the vapors, the uncondensed vapors flow out of the shell of the heat exchanger 17 through the pipe 18 which has the pressure control valve 19 therein which connects the other end of the heat exchanger 17 to the separator 20 for flow of uncondensed vapors from the cold end of the heat exchanger to the separator 20. For the purpose of reversing the flow of fluids through the system, a flow line or pipe 21 is connected to the vapor discharge line 18 extending from the heat exchanger 17, the pipe 21 including the check valve 22 which prevents flow of vapors in the line 21 from the heat exchanger 17.

The separator 20 is of identical construction to the separator 13, previously described, and includes the generally elongate cylindrical separation vessel 20a and lower liquid accumulator 20b joined by the downwardly extending and spaced pipes or conduits 20c, all as previously described.

As mentioned previously, the uncondensed vapors leaving the heat exchanger 17 through the discharge pipe 18 and flowing to the pressure control valve 19 are at a temperature below the hydrate stability condition for the particular pressure, in this case about 50° F. for 1500 p.s.i.g. The pressure control valve 19 is for the purpose of reducing the pressure of the vapor stream to a desired level, for example, 600 p.s.i.g., and, by such reduction of pressure, reducing the temperature of the stream to a low level, for example 10° F. The reduction of temperature causes additional condensation of liquids, both hydrocarbon and water, and the formation of solid hydrates in the separator 20. The liquid phase is separated from the vapor phase and collected in the accumulator section 20b of the separator 20 and the solid hydrates and ice are accumulated on the internal walls of the separation vessel 20. The removal of the liquid phase will presently be described. The vapors, now dehydrated and stripped of condensable hydrocarbons and water pass out of the separator section 20a of the separator 20 in the line 23 connected to the opposite end of the separator section 20, through the three-way valve 24 in the flow line or pipe 23, which is positioned to conduct the vapors into line 34 and into the tubes 17b of heat exchanger 17 for indirect heat exchange with the incoming vapors in the shell of heat exchanger 17. The vapors pass out of the tubes 17b into flow line 32 and into the three-way valve 33 which is positioned to conduct the vapors into flow line 37 and discharge pipe 26 into a distribution system not shown.

The accumulator sections 13b and 20b of the separators 13 and 20 each include the heat exchanger tubes 13d and 20d, respectively. One end of the heat exchanger tubes 13d is connected by the pipe 27 into the shell side of the accumulator section 20b and the other end of the heat exchanger tubes 13d are connected by the pipe 28 to the condensed liquids discharge pipe 29.

Similarly, one end of the heat exchanger tubes 20d is connected by the pipe 30 to the shell side of the accumulator 13b and the other end of the heat exchanger tubes 20d is connected by the pipe 31 to the condensate discharge pipe 29.

Thus, heat exchange is provided for both separation vessels 13 and 20, as will be described in more detail later.

The heat exchanger tubes 17b and the heat exchanger 17 are connected at one end by the pipe 32 through the three-way valve 33 to the pipe 14. The other end of the heat exchanger tubes 17b are connected by the pipe 34 to the pipe 23 through the three-way valve 24. As will be apparent later, this permits a reverse of flow through the system so that previously formed ice and hydrates are melted at one end of the heat exchanger while hydrates and ice are formed at the then cold end of the heat exchanger 17.

A pressure control or pressure reducing valve 35 is provided in the pipe 36 for flowing vapors from the heat exchanger 17 and pipe 15 into the separator 13 when the cycle is reversed, as will be apparent later.

No detailed description is given or deemed necessary with respect to the three-way valves 11, 24 and 33, the pressure control or pressure reducing valves 19 and 35 or the check valves 16 and 22 inasmuch as these valves are conventional, may readily be purchased on the open market and, as such, do not constitute the present invention.

In operation, well effluent enters the system through the gathering line 10 at an elevated temperature and pressure, for example, of the order of 1500 p.s.i.g. and 100° F. The three-way valve 11 is positioned so that the well effluent flows through one of the separators 13 or 20, say, through pipe 12 into the separator 13 where the liquid phase and vapor phase are separated at that pressure and temperature, the liquid phase accumulating in the accumulator section 13b of the separator 13 by flowing down the legs or pipes 13c and are discharged therefrom in the pipe 30 and through the heat exchanger tubes 20d in the accumulator section 20b of the separator 20 and out the discharge pipe 31 and 29 for separation of water from the condensed vapors. As will be apparent later, this serves to warm the liquids accumulating in the tail accumulator section 20b of the tail separator 20 thus preventing the blocking of liquid flow lines with solid hydrates or ice.

The vapors now flow through pipes 14 and 15 from the separator section 13a, through the check valve 16 into the shell of the heat exchanger 17, the three-way valve 33 in flow line 14 being positioned to block flow into line 14.

As mentioned previously, the vapors enter the heat exchanger 17 at substantially the same pressure and temperature as the fluids entering the system in line 10, but heat is removed from the vapors as they pass through the heat exchanger 17 causing condensation of liquids, both hydrocarbons and water. These liquids are accumulated in the accumulator 17a and are discharged therefrom in discharge pipe 37 connected to the discharge pipe 29 for removal from the system.

As mentioned previously, in addition to liquids being condensed in the heat exchanger 17 and accumulated in the accumulator 17a, solid hydrates are deliberately formed in the cold end of the heat exchanger 17 as the mixtures are reduced below the hydrate stability condition of temperature and pressure, for example 50° to 60° F. at 1500 p.s.i.g., which solid hydrates are deposited on the external walls of the tubes 17b of the heat exchanger 17.

The remaining vapors pass out of the heat exchanger 17 in pipe 18, the check valve 22 preventing flow in flow line 21, and pass through the pressure reducing valve 19 which reduces the pressure of the vapors flowing into the separator 20. The pressure reducing valve 19 reduces the pressure of the stream to the desired level, for example 600 p.s.i.g., thereby reducing the temperature of the stream to a low level, for example, approximately 10° F. This reduction of pressure causes additional condensation of liquids, both hydrocarbons and water, and the formation of solid hydrates which are accumulated on the internal walls of the separator 20. The liquid phase is separated from the vapor phase in the separator portion 20a of the separator 20 and passes by means of the pipes 20c into the accumulator section 20b thereof. These liquids are discharged in the pipe 27 and are first passed through the heat exchange tubes 31d in the accumulator section 13b of the separator 13 for warming by indirect heat exchange relationship with the liquids collected in the accumulator section 13b to prevent the formation of ice in the flow lines, and then are discharged therefrom in the flow lines 28 and 29. In this connection, it is noted that the initial separation made in the separator 13 does not provide a lowering of temperature of the liquids accumulated in the accumulator section 13b so that the temperature of these liquids is high with respect to the liquids from the accumulator section 20b from the tail separator 20.

The vapor phase, now at a reduced pressure and temperature, for example, 600 p.s.i.g. and 10° F., is withdrawn from the separator portion 20a of the separation vessel 20 in the pipe 23, the higher pressure in the pipe 21 preventing passage thereof through the check valve 22, and the valve 24 being positioned so that the vapor phase flows into the pipe 34, into the heat exchanger tubes 17b of the heat exchanger 17 to provide cooling for the vapors entering the heat exchanger 17. The cold vapors accept heat from the high pressure stream on the shell side of the heat exchanger 17 and then are withdrawn in pipe 32 at the same pressure but at an elevated temperature, for example approximately 65° F., the position of the three-way valve 33 being such that the vapors, now dehydrated and stripped of condensable hydrocarbons and water pass through the discharge line 37 and discharge pipe 26 into a distribution system or for further use or processing, as desired.

Before the accumulation of solids on the walls of the heat exchanger 17 and the separator 20 is sufficient to block the passage of fluids, the position of the three-way valves 11, 24 and 33 are switched. In practice, it has been found satisfactory to automatically switch these valves by means of a time cycling device, for example, on a six hour time cycle. Obviously, this can be accomplished equally as effectively by a pressure differential control or temperature controls which are responsive to the pressure differential or temperature in the vessels, or this may be done manually. It is deemed unnecessary to describe in detail means for switching the position of the three-way valves as various time cycling devices, pressure differential controls or temperature controls are widely and readily available on the market and to describe these in detail would unduly complicate and extend the specification.

When the valves are switched as mentioned, the stream of fluids entering through the gathering pipe 10 passes through the valve 11 and pipe 36 connected to the separator portion 20a of the separator 20, which is now the first separator rather than the tail separator. This stream of fluids, being at a high pressure and temperature, for example 1500 p.s.i.g. and 100° F. cause the solids accumulated on the walls of the separation vessel 20 to melt and form liquids, which are separated from the vapors and accumulated with the condensed liquid portion of the incoming stream in the lower accumulator section 20b of the separator 20. These accumulated liquids are discharged in the flow line 27 from the accumulator vessel 20b and pass through the heat exchanger tubes 13d in the accumulator section 13b of the separator 13 for warming the liquids accumulated therein. They then flow in line 28 and out discharge line 29 from the system.

The vapors are passed out of the separator 20 in pipe 23, through pipe 21, check valve 22 and pipe 18 into the opposite end of the shell side of the heat exchanger 17 from that of the flow line 15 where the heat content of the vapors melt the solids accumulated on the tubes 17b at the cold end of the heat exchanger 17. This heat exchange relationship causes condensation of liquids, both hydrocarbon and water, from the vapor stream entering the shell side of the heat exchanger 17 in addition to melting the solids on the heat exchanger tubes 17b, which liquids are collected in the accumulator 17a and discharged in pipe 37 and pipe 29 from the system as previously described.

As the temperature is decreased and the vapors pass through the heat exchanger 17, solid hydrates are formed and deposited on the external walls of the heat exchanger tube 17b at the opposite end of the heat exchanger where the vapors are reduced in temperature, for example to a temperature of 50° F. but are at the same pressure as entering the system, for example 1500 p.s.i.g.

The vapors at this reduced temperature but at the same pressure leave the heat exchanger 17 through the pipe 15 and are prevented from flowing into the pipe 14 by means of the check valve 16 and therefrom flow in the pipe 36 through the pressure reducing valve 35 into the separator 13 where the pressure is reduced, and thereby the temperature as described in connection with the operation of the pressure reducing valve 19 and separator 20. Thus, the pressure is reduced, for example, to 600 p.s.i.g. and the temperature is reduced, for example to 10° F. thereby forming solids and condensing vapors.

The mixture of vapors, liquids and solids thus formed are passed into the separator 13, which is free of solid materials at this time, the liquid phase being collected in the accumulator section 13b of the separator 13 and the solids being deposited on the internal walls of the separator 13. The accumulated liquids in the accumulator section 13b of the separator 13 are warmed by indirect heat exchange relationship with the liquids flowing in the tube 13b and are then discharged from the accumulator 13b through line 30, first being passed through the heat exchanger tubes 20d in the accumulator section 20b of the separator 20 for warming by indirect heat exchange relationship with the liquids accumulated therein before being discharged from the system in the pipes 31 and 29.

The cooled, dehydrated and stripped vapors leave the separator portion 13a through the pipe 14 and three-way valve 33 into the pipe 32 leading to the heat exchanger tube 17b in the heat exchanger 17 for the purpose of lowering the temperature of the vapors in the heat exchanger 17, as previously described. Also, as previously mentioned, the vapors in the heat exchange tube 17b receive heat and then pass in line 34 through the three-way valve 24 out the discharge pipes 25 and 26 to a distribution system, not shown. The vapors leaving the system in discharge line 26.

As mentioned previously, the liquids collected during the relatively warm separation of vapors from liquids are utilized to warm the cold liquids separated during the relatively cold portion of the separation, and the collected vapors are utilized to provide a portion of the temperature drop for separating the condensable vapors from the vapors prior to the cooling effect derived as a result of the pressure drop. It is also noted, that the system is a completely continuous system in which ice hydrates are deliberately formed and periodically melted. Also, that a reversible system is provided.

Thus, the apparatus of the invention comprises a pair of separators, each provided with an accumulator, in which separation of condensable vapors is simultaneously provided in one at a relatively high pressure and above hydrate-forming temperature and in the other at a reduced pressure and below hydrate-forming temperature, the accumulators of each being interconnected in heat exchange relationship so that the liquids collected or accumulated in the relatively warm separation are utilized to warm the liquids collected in the relatively cold separation thereby preventing the formation of solids and ice in flow lines. The separators are interconnected through a heat exchanger which advantageously and effectively utilizes the cooled uncondensed vapors of the relatively cool tail separator for lowering the temperature of the vapors from the relatively warm separation whereby additional liquids are condensed and collected and discharged for subsequent use or processing. The apparatus and system is completely reversible, as mentioned previously, and includes means by which this may be accomplished so that the solids formed are melted before the passage of fluids through the apparatus and system is blocked.

The method of the invention has been described in some detail in connection with the apparatus of the invention. The method includes, however, what might be termed the step of first separating condensable liquids from the mixture at a relatively high pressure and relatively warm temperature, that is, above hydrate forming temperatures, a second step of separating additional condensable liquids from the vapors from the first step by heat exchange relationship with cooled vapors from the final step or tail separation which comprises further separating condensable vapors from the vapors of the second step by reducing the pressure thereof and thereby reducing their temperature below hydrate forming temperature. The method is reversible, that is the first and final or tail steps are reversed for the purpose of melting solids formed in these steps and for the purpose of melting solids formed in the second step. As a refinement, the collected liquids of steps one and two are brought into indirect heat exchange relationship with one another for the purpose of warming the liquids condensed during the final or relatively cold step or tail separation.

It is understood that the precise operating conditions, temperatures, pressures, pressure drop and the like will vary considerably depending upon the type of feed, pressures and temperatures thereof, all of which may be determined readily and easily by simple pilot tests. Also, suitable gauges, valves, controls and the like may be used, as desired, depending upon the conditions of the system or systems to which the invention is applied.

As mentioned previously, numerous automatic control systems for switching from the warm to the cool step and back again can be used. For example, as mentioned previously, a time cycle can be used to govern the defrost cycle. Also, a flow controller, may be used wherein the defrost cycle is controlled by the total fluids which have been processed. Also, if desired, a temperature control system wherein either the outlet gas temperature or outlet discharge liquid temperature is measured may be utilized. For example, since the build-up of solids on the external surface of the heat exchanger tubes 17b reduces its heat exchange efficiency, an increase in tail gas temperatures in either lines 32 or 34 indicates to the automatic controller that defrosting is in order. Also, other temperature controls may be placed in other portions of the system for this purpose.

The method and apparatus according to the present invention in forming the solids and gas hydrates removes water vapor and impurities entrained therein from the uncondensed vapors discharged from the system. This advantageously lowers the water dew point of the gas so that the gas is dehydrated. This is important due to the fact that in selling gas it must have a low water dew point. Many systems dehydrate the gas but obtain no other return than the removal of water from the gas. The present system deliberately sets out to form hydrates by which an increased amount of liquefiable fractions of the hydrocarbon vapors are recovered and the water and impurities are removed due to formation of these hydrates in a very economical and reliably efficient manner.

Obviously, the above description of the method and apparatus of the invention, which are given for the purpose of disclosure, is merely a typical arrangement and an example of a particular use. It is understood that the particular arrangement of parts, pressures and temperatures of the system are all variable and the arrangement and operation conditions will vary considerably in view of these and other variables so long as the pressure is sufficient to provide a pressure drop which reduces the temperature of the vapors to a point where hydrates will be formed.

The present invention is particularly advantageous in that it provides an economical and reliable method of and apparatus for recovering condensable vapors which are normally lost in conventional separation procedures and for removing impurities from the uncondensable gas without the necessity of adding inhibitors or providing auxiliary refrigeration, although these may be utilized to increase the effectiveness of the present invention if desired.

It is therefore apparent that both the apparatus and method of the present invention are well suited to carry out the foregoing objects and attain the ends and advantages mentioned as well as others inherent therein.

Many changes in details, arrangement of parts, operating conditions and the like will readily suggest themselves to those skilled in the art, as well as many and varied applications, which are encompassed within the spirit of the invention and the scope of the appended claims.

What is claimed is:

1. A method of recovering condensable vapors, including those which form hydrates, contained in mixtures comprising, flowing the mixture first into a first separator maintained at a relatively high pressure and temperature sufficient to liquefy a portion of the condensable vapors of the mixture and sufficient to prevent the formation of hydrates in the first separator, flowing the uncondensed vapors from the first separator to a heat exchanger maintained at substantially the same pressure as that of the first separator but at a relatively lower temperature sufficient to condense a portion of the condensable vapors from the uncondensed vapors and to form hydrates in the heat exchanger, reducing the pressure of uncondensed vapors from the heat exchanger sufficient to lower the temperature thereof so that additional uncondensed vapors will be condensed and hydrates will form and flowing them to a second separator maintained at a substantially lower pressure and temperature than the first separator and sufficiently low to condense liquids and form hydrates therein for separation of said additional condensable vapors and hydrates therefrom, flowing the cooled uncondensable vapors from the second separator to the heat exchanger in indirect heat exchange relationship with the uncondensed vapors from the first separator for condensing a portion thereof and forming hydrates therein as aforesaid, discharging the cooled uncondensed vapors from the heat exchanger, collecting the condensed vapors from the first and second separators and the heat exchanger, and reversing the process by first flowing the mixture into the second separator while maintaining the second separator at a relatively high temperature and pressure sufficient to melt hydrates formed therein and to condense and to liquefy a portion of the condensable vapors of the mixture and to prevent the formation of hydrates therein, flowing the uncondensed vapors from the second separator to the heat exchanger, reducing the pressure of uncondensed vapors from the heat exchanger and flowing them into the first separator while maintaining the first separator at a substantially lower pressure and temperature than the second separator and sufficiently low to condense liquids and to form hydrates therein, and flowing cooled uncondensed vapors from the first separator to the heat exchanger and into indirect heat exchange relationship with the uncondensed vapors therein from the second separator.

2. The apparatus of claim 1 where the heat exchanger is an elongate cylindrical vessel and the flow lines connect one each of said separators to opposite ends of said heat exchanger whereby solids are formed at one end and melted at the other end upon reversing flow of said mixtures to said separators and said uncondensed vapors from the other of said separators to said heat exchanger.

3. The method of claim 1 including the additional steps of flowing the condensed vapors collected from the first and second separators through the other of the first and second separators in indirect heat exchange relationship with the condensed vapors therein.

4. The method of claim 3 where the condensable vapors include hydrocarbons.

5. A method of recovering condensable vapors contained in mixtures from natural oil and gas wells comprising, first flowing the mixture into a first separator maintained at a relatively high pressure and at a temperature sufficient to liquefy a portion of the condensable vapors of the mixture and to prevent the formation of hydrates in the first separator, flowing uncondensed vapors from the first separator to the heat exchanger maintained at substantially the same pressure as that of the first separator but at a lower temperature sufficient to condense a portion of the condensable vapors from the uncondensed vapors and to form hydrates in the heat exchanger, flowing uncondensed vapors from the heat exchanger and reducing the pressure thereof sufficient to lower the temperature thereof so that additional condensed vapors will be condensed and hydrates will form and flowing them to a second separator maintained at a substantially lower pressure and temperature than the first separator and sufficiently low to condense vapors and form hydrates therein for separation of additional condensable vapors therefrom, flowing the cooled uncondensable vapors from the second separator to the heat exchanger and into indirect heat exchange relationship with the uncondensed vapors from the first separator for condensing a portion thereof as aforesaid, and reversing said process by first flowing the mixture into the second separator maintained at a relatively high pressure and at a temperature sufficient to liquefy a portion of the condensable vapors of the mixture and to melt the hydrates formed therein, flowing the uncondensed vapors from the second separator to the heat exchanger, reducing the pressure of the uncondensed vapors from the heat exchanger and flowing them into the first separator maintained at a relatively low pressure and low temperature sufficient to condense vapors thereof and to form hydrates therein, and flowing cooled uncondensed vapors from the first separator to the heat exchanger and into indirect heat exchange relationship with the uncondensed vapors therein from the second separator, discharging the cooled uncondensed vapors from the heat exchanger, and collecting the condensed vapors from the first and second separators and the heat exchanger.

6. Apparatus for recovering condensable vapors and purifying uncondensable vapors contained in mixtures comprising, a pair of separators, means for selectively flowing said mixtures into each of said separators, an elongate cylindrical heat exchanger for cooling uncondensed vapors from each of the separators, flow lines connecting one each of said separators to opposite ends of said heat exchanger whereby solids are formed at one end and melted at the other end by periodic cycling of the flow of the uncondensed vapors from first one separator and then the other separator, pressure control means associated with each separator and arranged for decreasing the pressure of the uncondensed vapors flowing from the heat exchanger to each said separator for reducing the temperature thereof, additional flow lines extending from each separator to the heat exchanger and arranged for flowing uncondensed cooled vapors through the heat exchanger in indirect heat relationship with the vapors therein, an accumulator disposed below each separator, additional heat exchangers in each accumulator, discharge means at the lower portions of each accumulator and the heat exchanger for removal of condensed vapors therefrom, piping connecting each additional heat exchanger with the discharge means of the other accumulator whereby condensed vapors in each accumulator are brought into indirect heat exchange relationship with the condensed vapors in the other accumulator, additional discharge means associated with each additional heat exchanger for discharge of condensed vapors therefrom, and reversing means for reversing flow of said mixtures and vapors through said apparatus including means for periodically reversing flow of said mixtures to each of said separators, means for reversing flow of condensed vapors from first one of said separators to said heat exchanger and then to the other of said separators, and including means for reversing flow of uncondensed vapors from first one of said separators and then the other of said separators to said heat exchanger for indirect heat exchange relationship therewith as aforesaid.

7. Apparatus for recovering condensable vapors and purifying uncondensable vapors contained in mixtures comprising, a pair of separators, means for selectively flowing said mixtures into each of said separators, a heat exchanger for cooling uncondensed vapors from each of said separators, flow lines connecting each separator with the heat exchanger for flow of said uncondensed vapors from one separator to the heat exchanger to the other separator, pressure control means associated with each separator and arranged to decrease the pressure and thereby the temperature of uncondensed vapors flowing from the heat exchanger to each separator to below hydrate-forming temperature of water vapor contained in said vapors, additional flow lines extending from each separator to the heat exchanger and arranged for flowing uncondensed cooled vapors through the heat exchanger in indirect heat exchange relationship with the vapors therein, discharge means at the lower portions of each separator and the heat exchanger for removal of condensed vapors therefrom, and reversing means for reversing flow of said mixtures and vapors through said apparatus including, means for periodically reversing flow of said mixtures to each of said separators, means for reversing flow of condensed vapors from first one of said separators to said heat exchanger and then to the other of said separators, and including means for reversing flow of uncondensed vapors from first one of said separators and then the other of said separators to said heat exchanger for indirect heat exchange relationship therewith as aforesaid.

8. Apparatus for recovering condensable vapors and purifying uncondensable vapors contained in mixtures having water vapor therein comprising, a pair of separators, means for selectively flowing said mixtures into each of said separators, an accumulator disposed at the lower portion of each separator for collection of uncondensed vapors, a heat exchanger for cooling uncondensed vapors from the separators, flow means connecting each separator with the heat exchanger for flow of said uncondensed vapors from one separator to the heat exchanger to the other separator, pressure control means associated with each separator and arranged to decrease the pressure and thereby the temperature of uncondensed vapors flowing from the heat exchanger to each separator to below hydrate-forming temperature for reducing the temperature of that separator to below hydrate-forming temperature into which uncondensed vapors are flowed from the heat exchanger, discharge means at the lower portion of each accumulator and the heat exchanger for removal of condensed vapors therefrom, additional heat exchangers in each accumulator, flow lines connecting each additional heat exchanger with the discharge means of the other accumulator whereby the condensed vapors in one accumulator are brought into indirect heat relationship with the condensed vapors of the other accumulator, additional discharge means connected to each of the additional heat exchangers for discharge of condensed vapors therefrom, and reversing means for reversing flow of said mixtures and vapors through said apparatus including, means for periodically reversing flow of said mixtures to each of said separators, means for reversing flow of condensed vapors first from one of said separators to said heat exchanger and then to the other of said separators, and including means for reversing flow of uncondensed vapors from first the other of said separators and then the one of said separators to the heat exchanger for indirect heat exchange relationship therewith as aforesaid.

9. Apparatus for recovering condensable vapors and purifying uncondensable vapors contained in mixtures including water vapor comprising, a pair of separators, means for selectively flowing said mixtures into each of said separators, a heat exchanger for cooling uncondensed vapors from the separators, flow lines connecting each separator with the heat exchanger for flow of said uncondensed vapors from one separator to the heat exchanger to the other separator, pressure control means associated with each separator and arranged for decreasing the pressure and thereby the temperature of the uncondensed vapors flowing from the heat exchanger to each separator sufficient to condense vapors and to form hydrates in the tail separator, discharge means at the lower portions of each separator in the heat exchanger for removal of condensed vapors therefrom, additional flow lines extending from each separator to the heat exchanger and arranged for flowing cooled uncondensable vapors from each separator to the heat exchanger in indirect heat exchange relationship with the vapors therein, and reversing means for reversing flow of said mixtures and vapors through said apparatus including, means for periodically reversing flow of said mixtures to each of said separators, means for reversing flow of condensed vapors, from first one of said separators to said heat exchanger and then to the other of said separators, and including means for reversing flow of uncondensed vapors from first the other of said separators to the one of said separators to said heat exchanger for indirect heat exchange relationship therewith as aforesaid.

References Cited in the file of this patent

UNITED STATES PATENTS

| | | |
|---|---|---|
| 2,728,406 | Maher | Dec. 27, 1955 |
| 2,747,002 | Walker et al. | May 22, 1956 |
| 2,758,665 | Francis | Aug. 14, 1956 |